United States Patent
A V et al.

(10) Patent No.: US 12,252,009 B2
(45) Date of Patent: Mar. 18, 2025

(54) DEVICE FOR FILLING A FUEL TANK WITH FUEL

(71) Applicant: Volvo Truck Corporation, Gothenburg (SE)

(72) Inventors: Krishna Kashyap A V, Bangalore Karnataka (IN); Arul Murugan Selvakumar, Bengaluru Karnataka (IN); Saravana Subramanian, Bangalore Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 76 days.

(21) Appl. No.: 18/337,665

(22) Filed: Jun. 20, 2023

(65) Prior Publication Data

US 2023/0415566 A1 Dec. 28, 2023

(30) Foreign Application Priority Data

Jun. 27, 2022 (EP) ..................................... 22181132

(51) Int. Cl.
  *B60K 15/04* (2006.01)
  *B60K 15/077* (2006.01)
  *B60K 15/03* (2006.01)

(52) U.S. Cl.
  CPC ............ *B60K 15/077* (2013.01); *B60K 15/04* (2013.01); *B60K 15/0403* (2013.01); *B60K 2015/03434* (2013.01); *B60K 2015/0477* (2013.01)

(58) Field of Classification Search
  CPC .. B60K 2015/0477; B60K 2015/03236; B60K 2015/03375; B60K 2015/03434;
  (Continued)

(56) References Cited

U.S. PATENT DOCUMENTS 1,766,916 A * 6/1930 MacLiver .......... B60K 15/0403
  220/86.3
1,813,554 A * 7/1931 Wickline ........... B60K 15/0403
  220/86.3

(Continued)

FOREIGN PATENT DOCUMENTS

EP 1782993 A1 5/2007
EP 1782993 A3 7/2007

OTHER PUBLICATIONS

Extended European Search Report for European Patent Application No. 22181132.6, mailed Feb. 10, 2023, 5 pages.

*Primary Examiner* — Kelsey E Cary
(74) *Attorney, Agent, or Firm* — Withrow & Terranova, PLLC (57) ABSTRACT

A device for filling a fuel tank with fuel, comprising a tube formed member comprising an opening at a top end thereof for receiving fuel from a fuel nozzle, the tube formed member extending in a longitudinal direction of the device; and a fuel distribution member arranged to be provided inside the fuel tank and being connected to the tube formed member at a bottom end thereof, wherein the fuel distribution member comprises first and second plate elements which are spaced apart in the longitudinal direction and extend from the tube formed member in a radial direction thereof so that a space for fuel is formed between the first and second plate elements, wherein at least one of the first and second plate elements comprises perforations located in an area radially outside of the tube formed member for allowing fuel to enter the fuel tank.

15 Claims, 4 Drawing Sheets

(58) Field of Classification Search
CPC .......... B60K 2015/0344; B60K 15/077; B60K 15/04; B60K 15/0403
See application file for complete search history.

(56) References Cited

U.S. PATENT DOCUMENTS

| | | | |
|---|---|---|---|
| 1,999,336 | A | 4/1935 | McGillicuddy et al. |
| 2,104,132 | A * | 1/1938 | McGillicuddy .... B60K 15/0403 220/86.3 |
| 8,122,904 | B2 | 2/2012 | Wholey et al. |
| 2006/0237466 | A1* | 10/2006 | Nakanii ................ B60K 15/077 220/734 |
| 2008/0308182 | A1* | 12/2008 | Fowler ............... B60K 15/0403 141/370 |
| 2011/0031245 | A1* | 2/2011 | Wholey ............. B60K 15/0403 220/86.3 |
| 2012/0150456 | A1* | 6/2012 | Aharoni ............ B60K 15/0403 702/65 |
| 2012/0298213 | A1* | 11/2012 | Forster .............. B60K 15/0403 137/215 |

\* cited by examiner

DEVICE FOR FILLING A FUEL TANK WITH FUEL

RELATED APPLICATIONS

The present application claims priority to European Patent Application No. 22181132.6, filed on Jun. 27, 2022, and entitled "DEVICE FOR FILLING A FUEL TANK WITH FUEL," which is incorporated herein by reference in its entirety.

TECHNICAL FIELD

The invention relates to a device for filling a fuel tank with fuel. The invention also relates to a fuel tank, a vehicle and to a method.

The invention can be applied in heavy-duty vehicles, such as trucks, buses and construction equipment. Although the invention will be described with respect to a truck, the invention is not restricted to this particular vehicle, but may also be used in other vehicles such as work machines, e.g., dump trucks and wheel loaders. The invention may also be used in vessels, such as marine vessels.

BACKGROUND

Vehicles comprising internal combustion engines are equipped with fuel tanks for storing fuel, typically diesel and gasoline. Fuel is filled into the fuel tank via an opening. During operation of the vehicle the opening is typically closed by a lockable lid.

Even though the lid is locked, there is a risk of theft of fuel when e.g., the vehicle is parked and unmanned. As such, in addition to using a lockable lid, there is a need to provide further protection against fuel theft.

SUMMARY

In view of the above, an object of the invention is to provide an improved device for filling a fuel tank with fuel, or at least to provide a suitable alternative. Yet further objects of the invention are to provide an improved fuel tank, an improved vehicle and an improved method for mounting such a device, or at least to provide suitable alternatives.

According to a first aspect of the invention, the object is at least partly achieved by a device.
1. Hence, there is provided a device for filling a fuel tank with fuel. The device comprises:
2. —a tube formed member comprising an opening at a top end thereof for receiving fuel from a fuel nozzle, the tube formed member extending in a longitudinal direction of the device,
3. —a fuel distribution member arranged to be provided inside the fuel tank and being connected to the tube formed member at a bottom end thereof,
4. wherein the fuel distribution member comprises first and second plate elements which are spaced apart in the longitudinal direction and extend from the tube formed member in a radial direction thereof so that a space for fuel is formed between the first and second plate elements,
5. wherein at least one of the first and second plate elements comprises perforations located in an area radially outside of the tube formed member for allowing fuel to enter the fuel tank and wherein a surface of the device defining a bottom of the tube formed member, such as a bottom surface of the fuel distribution member which is aligned with the tube formed member, is free from perforations, such as solid, so as to prevent unauthorized removal of fuel from the fuel tank during use.

The tube formed member has a center axis which extend in the longitudinal direction of the device. The radial direction of the tube formed member is perpendicular to the longitudinal direction and to the center axis. By a top end and a bottom end as used herein is meant a top and a bottom with respect to the longitudinal direction and also with respect to gravitational forces, when the device is in use. In other words, fuel may flow into the fuel tank via the tube formed member by use of gravitational forces, i.e., in a downward direction towards a ground surface, when the device is in use.

By perforations is herein meant a plurality of openings which are located adjacent each other and adapted for allowing fuel to enter the fuel tank from the fuel distribution member. The perforations may have any shape, such as round-shaped, circular shaped, oval shaped, polygonal shaped, etc.

By the provision of a device as disclosed herein, an improved device for filling a fuel tank with fuel is provided. More specifically, by the configuration of the device, fuel can be filled into the fuel tank in a reliable manner, e.g., reducing the risk of fuel spillage, while at the same time the risk of unauthorized removal of fuel is prevented. The configuration of the device prevents a thief from being able to insert a pipe into the fuel tank which otherwise could be used for removing fuel from the fuel tank. In fact, the fuel distribution member, and optionally the tube formed member, will prevent a pipe from being entered into the fuel tank. This is for example achieved by the configuration of the bottom surface of the tube formed member, and also by the configuration and/or placement of the perforations as disclosed herein. While the device is advantageous for preventing fuel theft, it also allows fuel to be filled into the fuel tank in short time. More specifically, by the configuration of the plate elements with the perforations, a large amount of fuel can be filled into the fuel tank in short time.

6. Optionally, the space for fuel is closed off by a peripheral wall between the first and second plate elements. The peripheral wall may be a solid wall, thereby further preventing unauthorized removal of fuel. However, according to an example embodiment, the peripheral wall may comprise auxiliary perforations for allowing fuel to enter the fuel tank. Thereby, the fuel filling speed can be further increased.
7.
8. Optionally, the first plate element is attached to the tube formed member, such as attached thereto by a weld. Still optionally, the second plate element may be attached to the first plate element, such as attached thereto via the above-mentioned peripheral wall.
9.
10. Optionally, the first and second plate elements are further angled downwardly from the tube formed member. Thereby, the fuel distribution member may better follow the inner shape of the fuel tank, implying a more compact configuration requiring less space in the fuel tank.
11.
12. Optionally, the perforations are arranged so that fuel can be entered into the fuel tank in an upward direction through the first plate element and/or in a downward direction through the second plate element. This implies a high fuel filling speed. It also implies that the perforations will be more difficult to reach by a pipe which is inserted into the tube formed member. Hence, it will be more difficult to remove fuel from the fuel tank when the perforations are arranged in this manner.

Optionally, the device further comprises at least one protective wall element extending in the longitudinal direction of the device, and further extending so that it at least partly encloses the bottom of the tube formed member, so that any flexible pipes are prevented from being inserted into the fuel distribution member. For example, a first protective wall element may be attached to the first plate element and a second protective wall element may be attached to the second plate element, wherein the first and second protective wall elements form a labyrinth path for fuel. The labyrinth path prevents e.g., a flexible pipe, or hose, from being inserted into the fuel distribution member.

According to a second aspect of the invention, the object is at least partly achieved by a fuel tank.

Hence, there is provided a fuel tank comprising a device according to any one of the embodiments of the first aspect of the invention, wherein the fuel distribution member is arranged inside the fuel tank and wherein the tube formed member is extending through an opening of the fuel tank.

Advantages and effects of the second aspect of the invention are analogous to the advantages and effects of the first aspect of the invention. It shall also be noted that all embodiments of the first aspect are combinable with all embodiments of the second aspect, and vice versa.

Optionally, the extension of the first and second plate elements in the radial direction of the tube formed member corresponds to an extension which is substantially perpendicular to a longitudinal direction of the fuel tank. Still optionally, the fuel tank further comprises at least one partition element inside the fuel tank, wherein the partition element is having an extension in a sectional plane which is substantially perpendicular to the longitudinal direction of the fuel tank. Thereby, the plate elements may extend in the same extension as the at least one partition element, implying a compact configuration. Accordingly, in one example embodiment, the plate elements do not extend in the longitudinal direction of the fuel tank, but only in the direction which is substantially perpendicular to the longitudinal direction. For example, the fuel distribution member may be formed by a first and a second leg element which extend from each other in opposite directions which are perpendicular to the longitudinal direction of the fuel tank.

Optionally, the first plate element is provided adjacent an inner wall of the fuel tank, and the fluid distribution member is arranged inside the fuel tank so that a gap is formed between the first plate element and the inner wall of the fuel tank. Thereby, fuel can be efficiently filled into the fuel tank through the perforations which are provided on the first plate element, implying an increased fuel filling speed.

According to a third aspect of the invention, the object is at least partly achieved by a vehicle.

Hence, there is provided a vehicle comprising a fuel tank according to any one of the embodiments of the second aspect of the invention.

Advantages and effects of the third aspect are analogous to the advantages and effects of the first and second aspects of the invention. It shall also be noted that all embodiments of the third aspect are combinable with all embodiments of the first and second aspects of the invention, and vice versa.

According to a fourth aspect of the invention, the object is at least partly achieved by a method.

Hence, there is provided a method for mounting a device according to any one of the embodiments of the first aspect to a fuel tank according to any one of the embodiments of the second aspect. The method comprises mounting the device to the fuel tank by inserting the tube formed member into the opening of the fuel tank from the inside of the fuel tank so that the tube formed member extends out from the fuel tank. The method may further comprise closing the fuel tank by mounting and attaching a final wall element to the fuel tank. The device is inserted into the fuel tank via e.g., an opening where the final wall element is provided. The method may additionally comprise mounting one or more partition elements inside the fuel tank, which partition elements are also mounted at least before the final wall element is attached to the fuel tank.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are schematic and not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters throughout the drawings refer to the same, or similar, type of element unless expressed otherwise.

DETAILED DESCRIPTION

Figure 1:
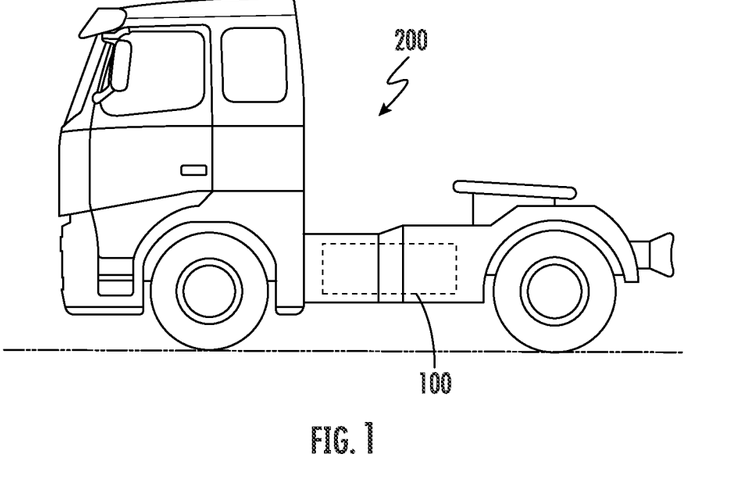
FIG. 1 is a side view of a vehicle according to an example embodiment of the present invention.

FIG. 1 depicts a side view of a vehicle 200 according to an example embodiment of the invention. The vehicle 200 is herein a heavy-duty truck, more specifically a towing truck for towing one or more trailers (not shown). Even though a truck is shown, it shall be understood that the present invention is not limited to this type of vehicle but may be used in any other vehicle requiring a fuel tank. The invention is also applicable to vessels, such as marine vessels comprising a fuel tank. The invention may also be applicable to stationary and/or portable fuel tanks which are used for storing fuel, such as used for storing fuel for a vehicle, such as for a wheel loader, excavator, bus or truck.

The vehicle 200 as shown in FIG. 1 comprises a fuel tank 100 according to an example embodiment of the invention. The fuel tank 100 comprises a device 1 according to an example embodiment of the invention. The device 1 will be further described in the below.

Figure 2A:
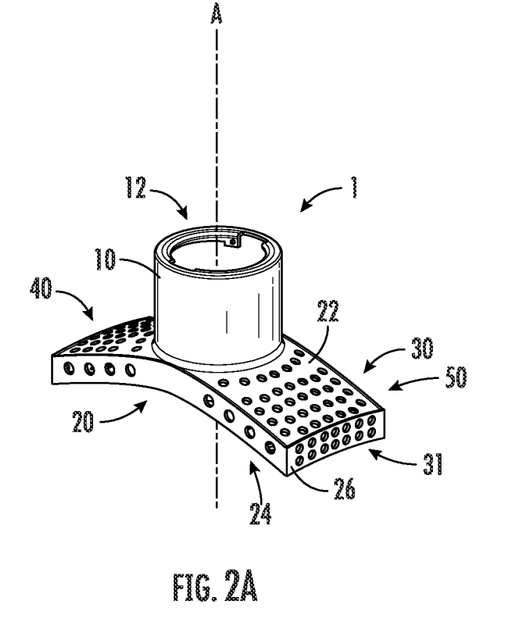
FIG. 2A is a perspective view of a device according to an example embodiment of the present invention.

FIG. 2A depicts a perspective view of an example embodiment of such a device 1, i.e., a device 1 for filling the fuel tank 100 with fuel.

The device 1 comprises a tube formed member 10. The tube formed member 10 comprises an opening 12 at a top end thereof for receiving fuel from a fuel nozzle (not shown). The tube formed member 10 extends in a longitudinal direction A of the device 1. The longitudinal direction A as shown herein also corresponds to a center axis of the tube formed member 10. In this example, the longitudinal direction A may further correspond to a vertical direction of the vehicle 200 when the vehicle 200 is provided on a flat horizontally extending surface. It shall be noted that the device 1 and the axis A does not necessarily need to be aligned with the vertical direction of the vehicle 200, but may also be inclined with respect to the vertical direction, such as at an angle of ±45 degrees with respect to the vertical direction.

The device 1 further comprises a fuel distribution member 20 arranged to be provided inside the fuel tank 100 and being connected to the tube formed member 10 at a bottom end thereof.

The fuel distribution member 20 comprises first and second plate elements 22, 24 which are spaced apart in the longitudinal direction A and extend from the tube formed member 10 in a radial direction thereof so that a space for fuel is formed between the first and second plate elements 22, 24. The radial direction herein extends perpendicularly from the center axis A.

Figure 3:
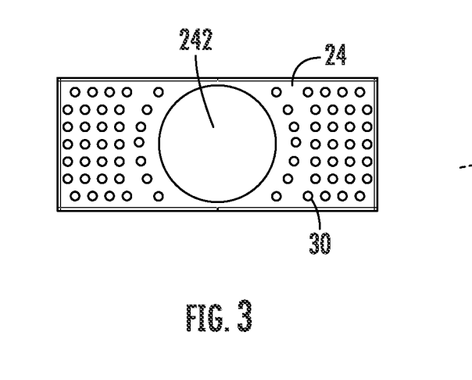
FIG. 3 is a view of a second plate element of a device according to an example embodiment of the present invention.

Furthermore, at least one of the first and second plate elements 22, 24 comprises perforations 30 located in an area radially outside of the tube formed member 10 for allowing fuel to enter the fuel tank 100. The perforations 30 are herein formed as round, or circular, openings, even though any other shape as e.g., disclosed herein could additionally or alternatively be used. For example, the perforations 30 may be formed by 10 or more openings, such as 10-200 openings. A surface 242 of the device 1 defining a bottom of the tube formed member 10, such as a bottom surface 242 of the fuel distribution member 20 which is aligned with the tube formed member 10, is free from perforations, such as solid, so as to prevent unauthorized removal of fuel from the fuel tank 100 during use. An example of a solid bottom surface 242 is shown in FIG. 3.

Figure 2B:
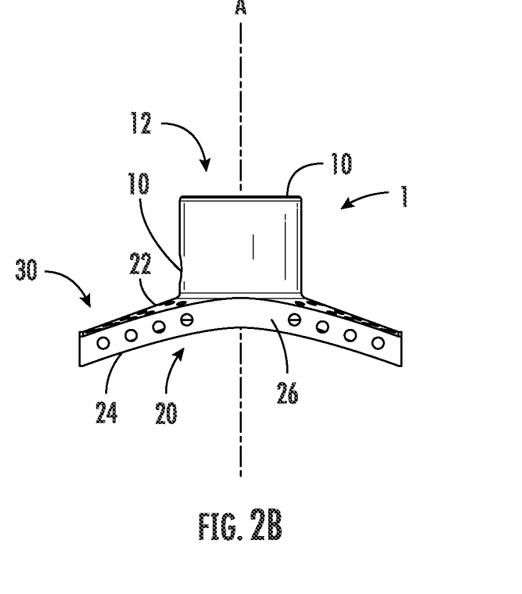
FIG. 2B is a side view of a device according to another example embodiment of the present invention.

As further shown in e.g., FIG. 2A, the space for fuel may be closed off by a peripheral wall 26 between the first and second plate elements 22, 24. In the shown embodiment, the peripheral wall 26 comprises auxiliary perforations 31. However, the peripheral wall 26 may alternatively be a solid wall, i.e., a wall without any perforations, as e.g., shown in FIG. 2B. More specifically, FIG. 2B depicts a side view of a device 1 according to another example embodiment where the peripheral wall 26 does not have any perforations.

In the embodiment shown in e.g., FIG. 2A, the first plate element 22 is attached to the tube formed member 10, such as by a weld. Thereby, a robust attachment is provided therebetween.

The first and second plate elements 22, 24 are further angled downwardly from the tube formed member 10.

The perforations 30 are arranged so that fuel can be entered into the fuel tank 100 in an upward direction through the first plate element 22 and in a downward direction through the second plate element 24.

FIG. 3 depicts a more detailed view of the second plate element 24 of e.g., the device 1 as shown in FIG. 2A. The view is from the inside of the fuel distribution member 20 and directed towards the second plate element 24 in the longitudinal direction A. The second plate element 24 comprises perforations 30 located in an area radially outside of the tube formed member 10 for allowing fuel to enter the fuel tank 100. A surface 242 of the device 1 defining a bottom of the tube formed member 10, herein a bottom surface 242 of the fuel distribution member 20 which is aligned with the tube formed member 10, is free from perforations 30. In the shown embodiment, the bottom surface 242 is solid so as to prevent unauthorized removal of fuel from the fuel tank 100 during use.

Figure 5A:
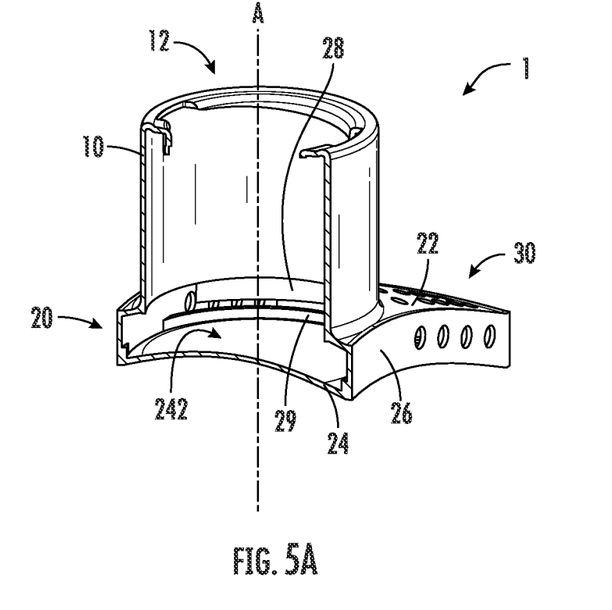
FIG. 5A is a perspective sectional view of a device according to an example embodiment of the present invention.
Figure 5B:
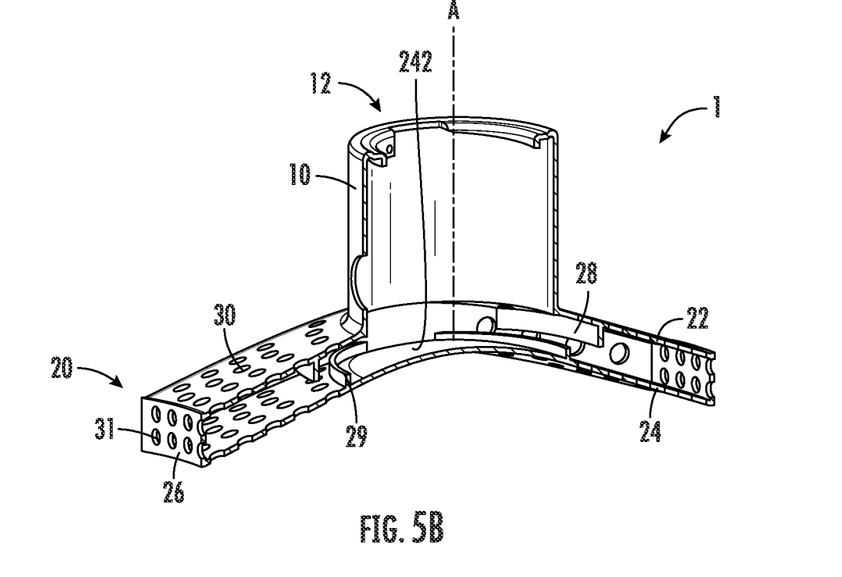
FIG. 5B is another perspective sectional view of the device as shown in FIG. 5A.

FIGS. 5A and 5B depict respective perspective and sectional views of a device 1 according to an example embodiment of the present invention: The device 1 as shown in FIGS. 5A-5B further comprises at least one protective wall element 28, 29 extending in the longitudinal direction A of the device 1, and further extending so that it at least partly encloses the bottom surface 242 of the tube formed member 10, so that any flexible pipes are prevented from being inserted into the fuel distribution member 20. As shown, a first protective wall element 28 may be attached to the first plate element 22 and a second protective wall element 29 may be attached to the second plate element 24, wherein the first and second protective wall elements 28, 29 form a labyrinth path for fuel. The labyrinth path prevents e.g., a flexible pipe, or hose, from being inserted into the fuel distribution member 20. The labyrinth path is herein provided in that a diameter of the first protective wall element 28 is larger than a diameter of the second protective wall element 29. An opposite configuration may of course also be possible, i.e., where a diameter of the first protective wall element 28 is smaller than a diameter of the second protective wall element 29. The diameters are herein measured in the radial direction of the device 1.

Figure 4:
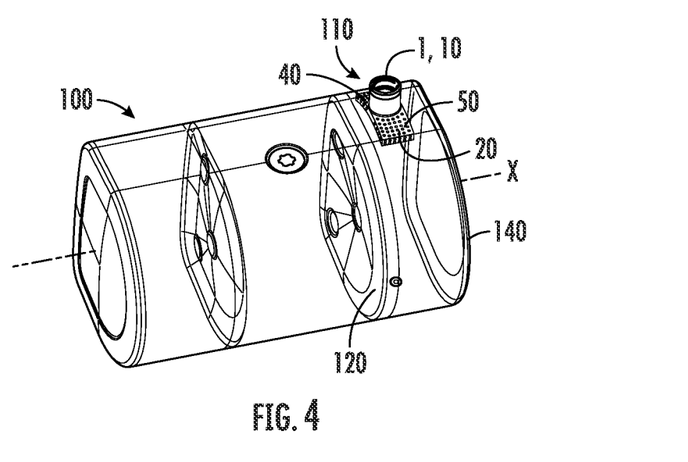
FIG. 4 is a perspective view of a fuel tank according to an example embodiment of the present invention.

FIG. 4 depicts a perspective and transparent view of a fuel tank 100 according to an example embodiment of the invention. The fuel tank 100 has a longitudinal direction X. The fuel tank 100 comprises a device 1 according to any one of the embodiments disclosed herein, wherein the fuel distribution member 20 is arranged inside the fuel tank 100 and wherein the tube formed member 10 is extending through an opening 110 of the fuel tank 100. The device 1 as disclosed herein may in one embodiment be denoted a filler neck device.

The extension of the first and second plate elements 22, 24 in the radial direction of the tube formed member 10 may as shown correspond to an extension which is substantially perpendicular to the longitudinal direction X of the fuel tank 100. More specifically, as also shown in e.g., FIG. 2A, the fuel distribution member 20 may be formed by a first and a second leg element 40, 50. The leg elements 40, 50 may as shown extend from each other in opposite directions which are perpendicular to the longitudinal direction X of the fuel tank 100.

The fuel tank 100 may as shown further comprise at least one partition element 120 inside the fuel tank 100, wherein the partition element 120 is having an extension in a sectional plane which also is substantially perpendicular to the longitudinal direction X of the fuel tank 100.

Figure 6:
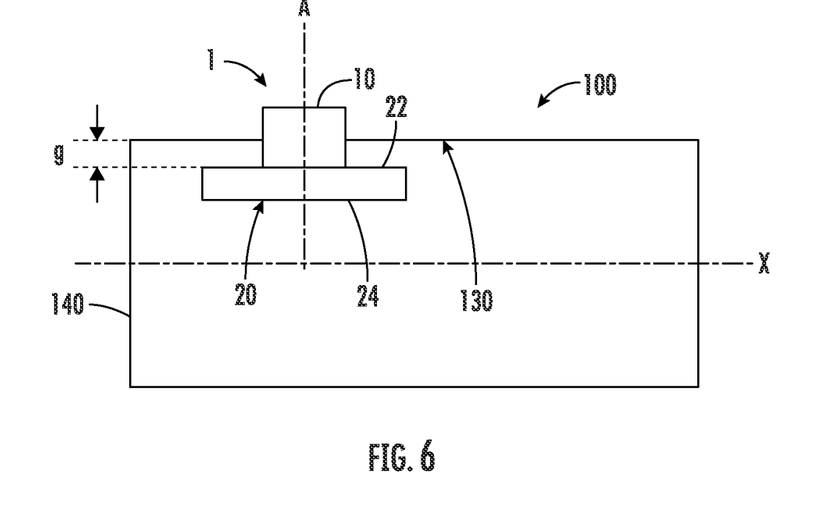
FIG. 6 is a schematic view of a fuel tank according to another example embodiment of the present invention.

FIG. 6 depicts a schematic view of a fuel tank 100 comprising a device 1 according to an example embodiment of the invention. As shown, the first plate element 22 of the device 1 may be provided adjacent an inner wall 130 of the fuel tank 100. Furthermore, the fluid distribution member 20 of the device 1 may be arranged inside the fuel tank 100 so that a gap g is formed between the first plate element 22 and the inner wall 130 of the fuel tank 100. The gap g extends in the longitudinal direction A of the device. For example, the gap g may be in the range of 1 centimeter (cm) to 20 cm, such as 2 to 10 cm. Thereby, fuel can enter the fuel tank 100 through the perforations 30 of the first plate element 22, i.e., in the upward direction.

Figure 7:
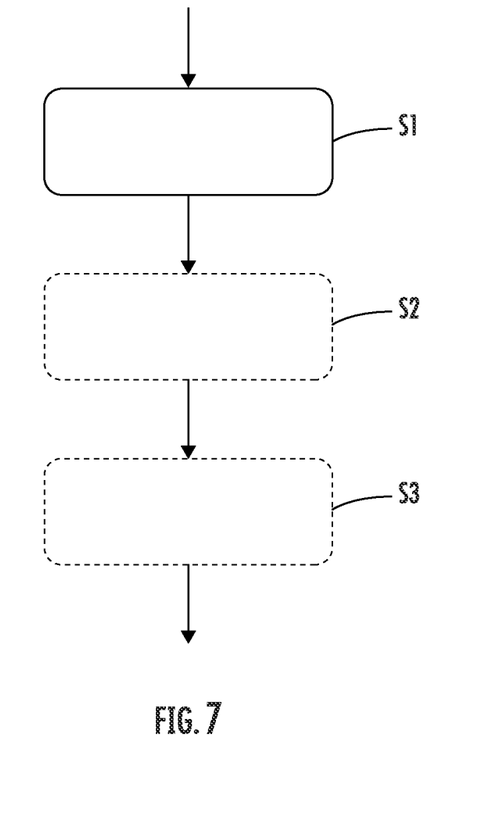
FIG. 7 is a flowchart of a method according to an example embodiment of the invention.

FIG. 7 depicts a flowchart of a mounting method according to an example embodiment of the invention. The method comprises:

S1: mounting the device 1 to the fuel tank 100 by inserting the tube formed member 10 into the opening 110 of the fuel tank 100 from the inside of the fuel tank 100 so that the tube formed member 10 extends out from the fuel tank 100. The mounting step S1 preferably further comprises attaching the device 1 to the fuel tank, such as by welding the tube formed member 10 to the fuel tank at the opening 110.

The method may further comprise:

S3: closing the fuel tank 100 by mounting and attaching a final wall element 140 (see e.g., FIG. 6) to the fuel tank 100. The device 1 is inserted into the fuel tank 100 via e.g., an opening which is subsequently closed by the final wall element 140.

The method may additionally comprise:

S2: mounting one or more partition elements 120 inside the fuel tank 100, which partition elements 120 are also mounted at least before the final wall element 140 is attached to the fuel tank.

The boxes with dashed lines in FIG. 7 indicate that the steps are optional. As indicated by arrows in FIG. 7, the method may comprise steps performed before step S1, and also after step S3. For example, further steps, such as forming the fuel tank 100 may be performed before step S1. In addition, further steps, such as mounting the fuel tank 100 to the vehicle 200, may be performed after step S3. Additional intermediate steps may also be performed in-between steps S1 and S2, and S2 and S3.

It is to be understood that the present invention is not limited to the embodiments described above and illustrated in the drawings; rather, the skilled person will recognize that many changes and modifications may be made within the scope of the appended claims.

The invention claimed is:

1. A device for filling a fuel tank with fuel, comprising:
    a tube formed member comprising an opening at a top end thereof for receiving fuel from a fuel nozzle, the tube formed member extending in a longitudinal direction of the device, and
    a fuel distribution member arranged to be provided inside the fuel tank and being connected to the tube formed member at a bottom end thereof,
    wherein the fuel distribution member comprises first and second plate elements which are spaced apart in the longitudinal direction and extend from the tube formed member in a radial direction thereof so that a space for fuel is formed between the first and the second plate elements,
    wherein at least one of the first and the second plate elements comprises perforations located in an area radially outside of the tube formed member for allowing fuel to enter the fuel tank and wherein a surface of the device defining a bottom of the tube formed member is free from perforations so as to prevent unauthorized removal of fuel from the fuel tank during use, and,
    wherein the space for fuel is closed off by a peripheral wall between the first and the second plate elements.

2. The device of claim 1, wherein the peripheral wall comprises auxiliary perforations for allowing fuel to enter the fuel tank.

3. The device of claim 1, wherein the first plate element is attached to the tube formed member.

4. The device of claim 3, wherein the first plate element is attached to the tube formed member by a weld.

5. The device of claim 1, wherein the first and the second plate elements are further angled downwardly from the tube formed member.

6. The device of claim 1, wherein the perforations are arranged so that fuel can be entered into the fuel tank in an upward direction through the first plate element and/or in a downward direction through the second plate element.

7. The device of claim 1, further comprising at least one protective wall element extending in the longitudinal direction of the device, and further extending so that the at least one protective wall element at least partly encloses the bottom of the tube formed member, so that any flexible pipes are prevented from being inserted into the fuel distribution member.

8. The device of claim 1, wherein the surface of the device defining a bottom of the tube formed member comprises a bottom surface of the fuel distribution member that is aligned with the tube formed member.

9. A fuel tank comprising the device of claim 1, wherein the fuel distribution member is arranged inside the fuel tank and wherein the tube formed member is extending through an opening of the fuel tank.

10. The fuel tank of claim 9, wherein the extension of the first and the second plate elements in the radial direction of the tube formed member corresponds to an extension which is substantially perpendicular to a longitudinal direction of the fuel tank.

11. The fuel tank of claim 10, further comprising at least one partition element inside the fuel tank, wherein the at least one partition element has an extension in a sectional plane which is substantially perpendicular to the longitudinal direction of the fuel tank.

12. The fuel tank of claim 9, wherein the first plate element is provided adjacent an inner wall of the fuel tank, and wherein the fluid distribution member is arranged inside the fuel tank so that a gap is formed between the first plate element and the inner wall of the fuel tank.

13. A vehicle comprising the fuel tank of claim 9.

14. A method for mounting the device of claim 1 to a fuel tank wherein the fuel distribution member is arranged inside the fuel tank and wherein the tube formed member is extending through an opening of the fuel tank, the method comprising:
   mounting the device to the fuel tank by inserting the tube formed member into the opening of the fuel tank from the inside of the fuel tank so that the tube formed member extends out from the fuel tank.

15. A device for filling a fuel tank with fuel, comprising:
   a tube formed member comprising an opening at a top end thereof for receiving fuel from a fuel nozzle, the tube formed member extending in a longitudinal direction of the device,
   a fuel distribution member arranged to be provided inside the fuel tank and being connected to the tube formed member at a bottom end thereof, and
   at least one protective wall element extending in the longitudinal direction of the device, and further extending so that the at least one protective wall element at least partly encloses the bottom of the tube formed member, so that any flexible pipes are prevented from being inserted into the fuel distribution member;
   wherein the fuel distribution member comprises first and second plate elements which are spaced apart in the longitudinal direction and extend from the tube formed member in a radial direction thereof so that a space for fuel is formed between the first and the second plate elements, and
   wherein at least one of the first and the second plate elements comprises perforations located in an area radially outside of the tube formed member for allowing fuel to enter the fuel tank and wherein a surface of the device defining a bottom of the tube formed member is free from perforations so as to prevent unauthorized removal of fuel from the fuel tank during use.

* * * * *